United States Patent
Tsai et al.

(10) Patent No.: US 8,421,687 B2
(45) Date of Patent: Apr. 16, 2013

(54) WIRELESS MOUSE

(75) Inventors: Yung-Chih Tsai, Taipei (TW);
Jia-Hung Su, Taipei (TW); Kai Shih, Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 399 days.

(21) Appl. No.: 12/948,758

(22) Filed: Nov. 18, 2010

(65) Prior Publication Data

US 2012/0127039 A1    May 24, 2012

(51) Int. Cl.
*H01Q 1/24* (2006.01)

(52) U.S. Cl.
USPC .......................................... 343/702; 345/163

(58) Field of Classification Search .................. 343/702; 345/163, 166
See application file for complete search history.

(56) References Cited

U.S. PATENT DOCUMENTS

| | | | | |
|---|---|---|---|---|
| 6,356,243 | B1* | 3/2002 | Schneider et al. | 343/866 |
| 7,411,580 | B2* | 8/2008 | Yanagi | 345/163 |
| 7,629,961 | B2* | 12/2009 | Casebolt et al. | 345/166 |
| 2006/0221055 | A1* | 10/2006 | Chang et al. | 345/163 |
| 2007/0075973 | A1* | 4/2007 | Tseng et al. | 345/163 |
| 2009/0051655 | A1* | 2/2009 | Chan | 345/163 |

* cited by examiner

*Primary Examiner* — Hoang V Nguyen
(74) *Attorney, Agent, or Firm* — Lin & Associates IP, Inc.

(57) ABSTRACT

A wireless mouse includes a mouse housing, a printed circuit board assembly assembled in the mouse housing, and an antenna mounted on a front end of the printed circuit board assembly. The front end of the printed circuit board assembly defines two fastening holes spaced from each other along a direction perpendicular to a front-to-rear direction. The antenna has a substantial long-strip radiating portion. Two opposite ends of the radiating portion are bent rearward and then downward to form a hook portion and a feed portion which are respectively hooked in the corresponding fastening holes to make the radiating portion transversely mounted over the front end of the printed circuit board assembly. The feed portion is electrically connected with a feed circuit of the printed circuit board assembly.

4 Claims, 4 Drawing Sheets

WIRELESS MOUSE

BACKGROUND OF THE INVENTION

1. Field of the Invention

The present invention generally relates to a mouse, and more particularly to a wireless mouse having an antenna therein.

2. The Related Art

As is known to all, mouse is a very popular computer input device. It allows a user to move an input pointer (e.g., cursor) and to make selections with respect to a graphical user interface (GUI). With the rapid development of computer, the mouse has gradually developed into a wireless mouse from a wire mouse. But the wireless mouse must use an antenna to achieve a signal transmission with the computer.

Referring to FIG. 1, a conventional wireless mouse includes a mouse housing 10, a printed circuit board assembly 12 assembled in the mouse housing 10, and a Planar Inverted-F Antenna (PIFA) 14 disposed on one side of the printed circuit board assembly 12. However, the PIFA 14 is a planar antennal and often is disposed by lying on the printed circuit board assembly 12. As a result, the PIFA 14 needs to occupy a greater space in the wireless mouse. Furthermore, the printed circuit board areas around the PIFA 14 cannot be provided with metallic elements therein, so that undoubtedly complicates the design of the PIFA 14. When users operate the wireless mouse, users' hands are apt to approach the region where the PIFA 14 is disposed. It further has an impact on use performances of the PIFA 14.

SUMMARY OF THE INVENTION

An object of the present invention is to provide a wireless mouse. The wireless mouse includes a mouse housing, a printed circuit board assembly assembled in the mouse housing, and an antenna mounted on a front end of the printed circuit board assembly. The front end of the printed circuit board assembly defines two fastening holes spaced from each other along a direction perpendicular to a front-to-rear direction. The antenna has a substantial long-strip radiating portion. Two opposite ends of the radiating portion are bent rearward and then downward to form a hook portion and a feed portion which are respectively hooked in the corresponding fastening holes to make the radiating portion transversely mounted over the front end of the printed circuit board assembly. The feed portion is electrically connected with a feed circuit of the printed circuit board assembly.

As described above, the wireless mouse of the present invention disposes the antenna, which occupies a smaller space and has a simpler design, on the front end of the printed circuit board assembly to effectively utilize leisure space in the front of the wireless mouse and further miniaturize the wireless mouse. Moreover, it makes the antenna out of the influence from electronic elements of the printed circuit board assembly and users' hands when the wireless mouse is in use, to achieve a better use performance.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 2:
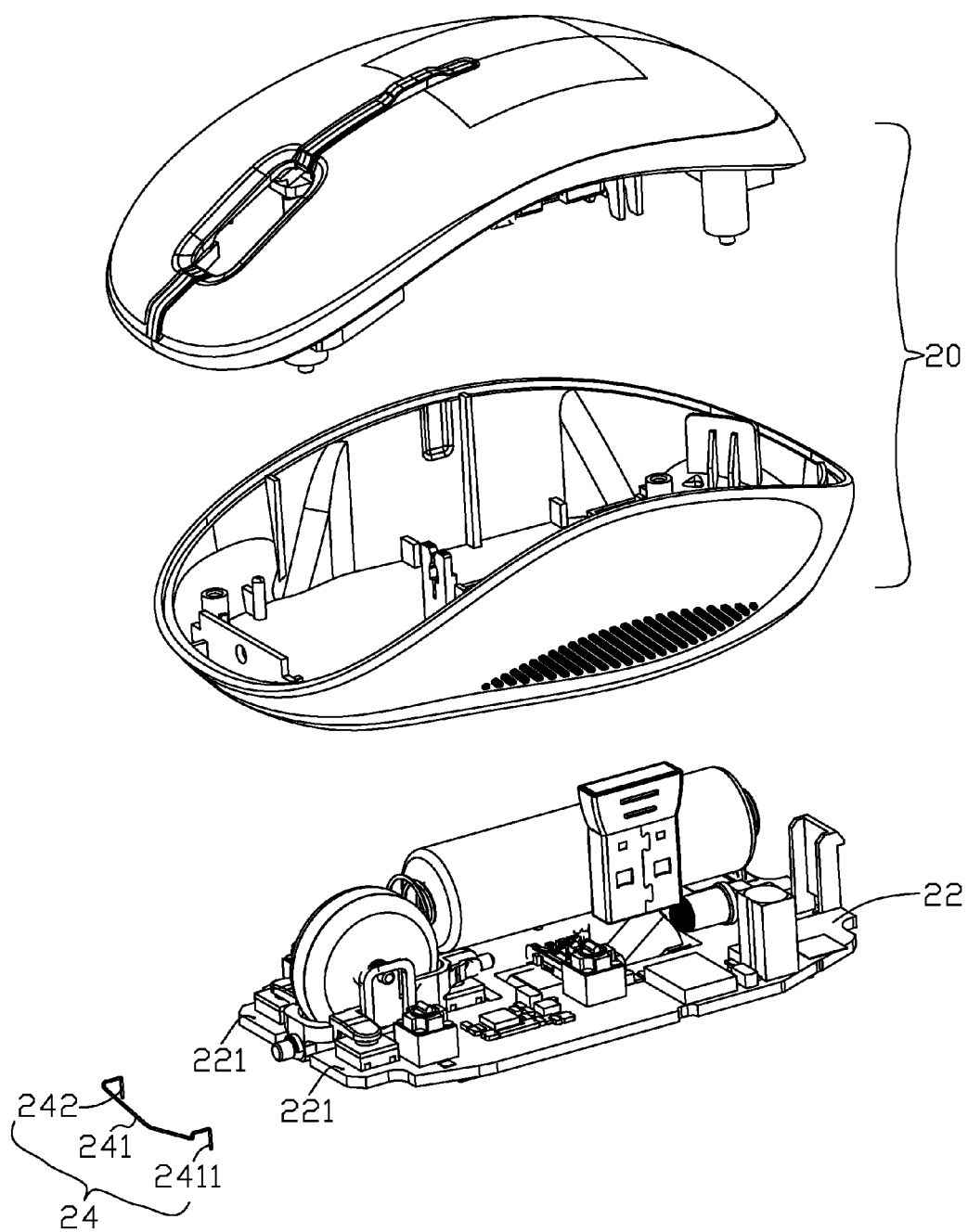
FIG. 2 is an exploded perspective view of a wireless mouse with a monopole antenna according to an embodiment of the present invention.

With reference to FIG. 2, a wireless mouse according to an embodiment of the present invention includes a mouse housing 20, a printed circuit board assembly 22 assembled in the mouse housing 20, and a monopole antenna 24 disposed on the printed circuit board assembly 22. A front end of the printed circuit board assembly 22 defines two fastening holes 221 spaced from each other along a direction perpendicular to a front-to-rear direction, and each vertically penetrating through the printed circuit board assembly 22.

The monopole antenna 24 has a substantial long-strip radiating portion 241. In the embodiment, the radiating portion 241 is further slightly bent to show a substantial gentle V-shape. Two opposite ends of the radiating portion 241 are bent towards a direction perpendicular to a vertical plane established by the V-shaped radiating portion 241, and then are further bent downward to form a hook portion 2411 and a feed portion 242, respectively. The hook portion 2411 and the feed portion 242 are respectively hooked in the corresponding fastening holes 221 to make the radiating portion 241 located over a middle of the front end of the printed circuit board assembly 22. The feed portion 242 is electrically connected with a feed circuit (not shown) of the printed circuit board assembly 22 by means of injecting melted metallic copper in the corresponding fastening hole 221. In the embodiment, the monopole antenna 24 can receive and send electromagnetic signals of 2.4 GHz frequency range.

Figure 3:
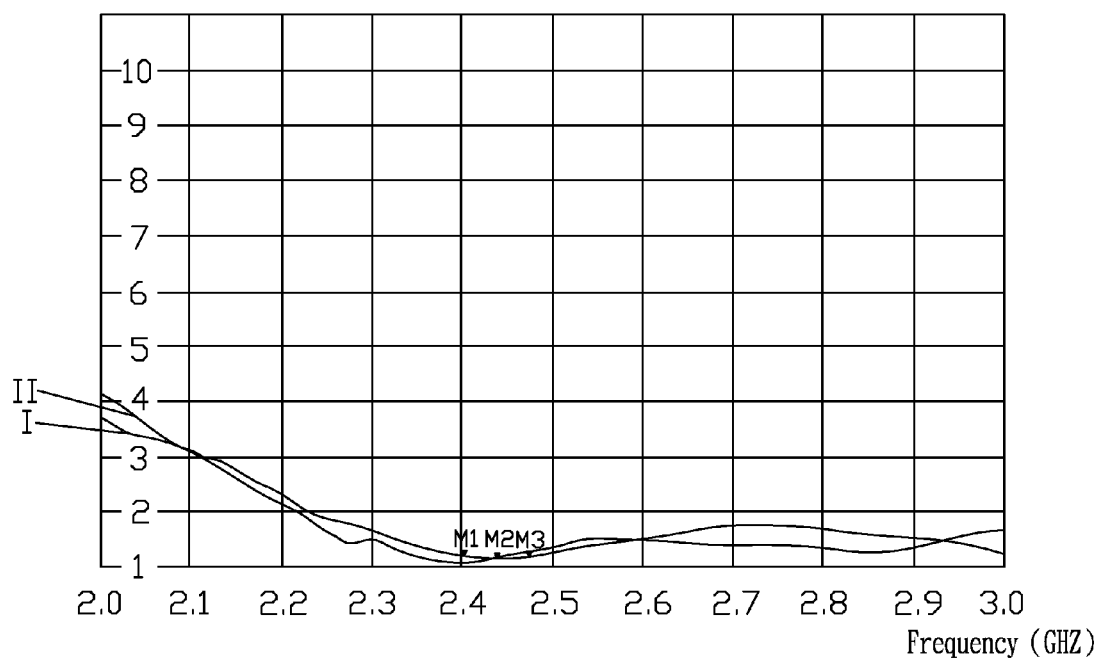
FIG. 3 shows a Voltage Standing Wave Ratio (VSWR) test chart of the monopole antenna of the wireless mouse of FIG. 2.

Please refer to FIG. 3, which shows a Voltage Standing Wave Ratio (VSWR) test chart of the monopole antenna 24 of the wireless mouse. The graph I shows the VSWR test values of the monopole antenna 24 before the wireless mouse is not processed by the Surface Mounted Technology (SMT). When the monopole antenna 24 operates at 2.403000 GHz, 2.441000 GHz and 2.477000 GHz, the VSWR values are 1.0818, 1.1523 and 1.2593, respectively. The graph II shows the VSWR test values of the monopole antenna 24 after the wireless mouse is processed by the SMT. When the monopole antenna 24 operates at 2.403000 GHz, 2.441000 GHz and 2.477000 GHz, the VSWR values are 1.2094, 1.1370 and 1.1860, respectively. As seen from above, the VSWR values of the monopole antenna 24 operated at about 2.4 GHz frequency range all are less than 1.5, so the monopole antenna 24 has an excellent impedance matching.

Figure 1:
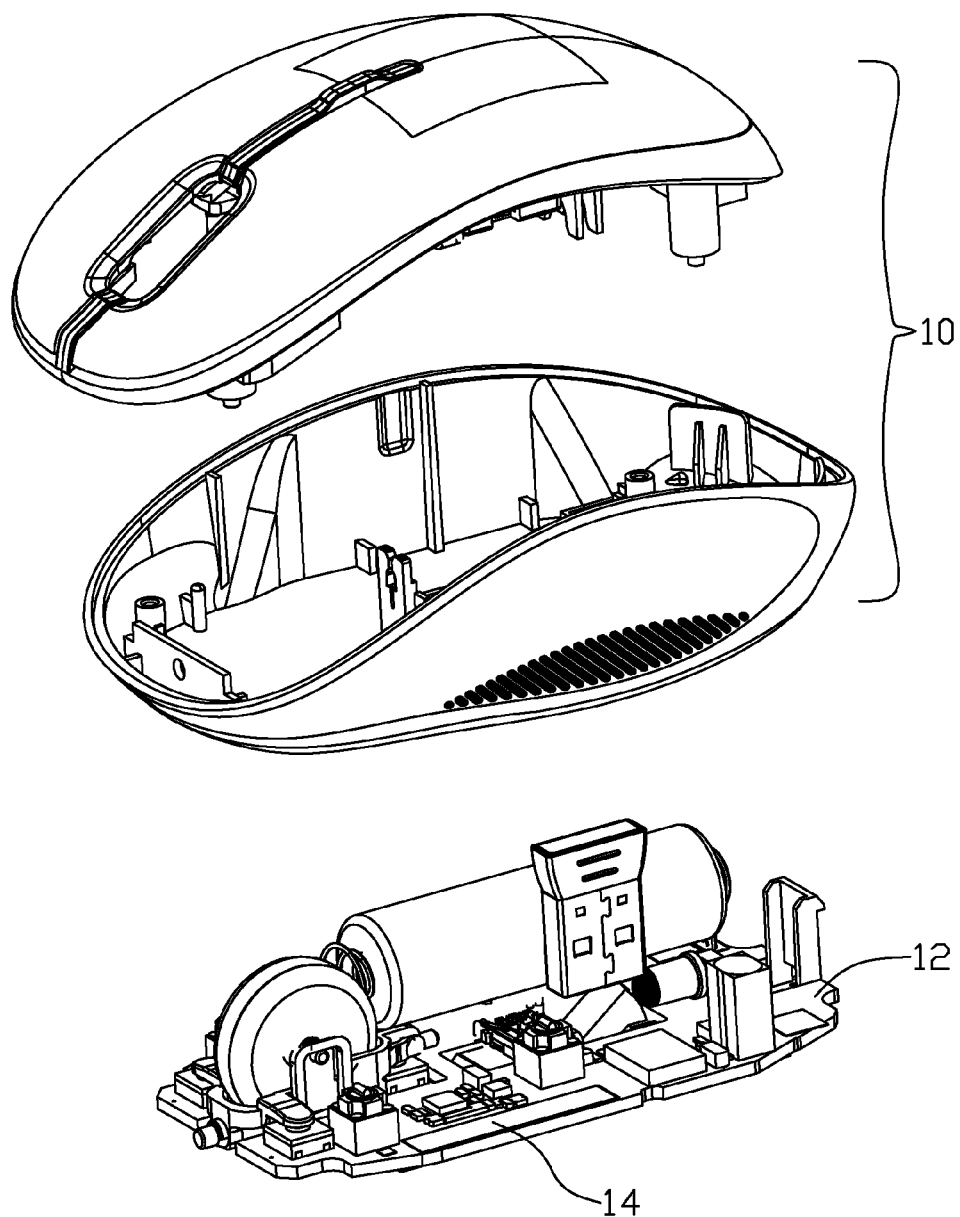
FIG. 1 is an exploded perspective view of a conventional wireless mouse with a planar inverted-F antenna according to the related art.
Figure 4:
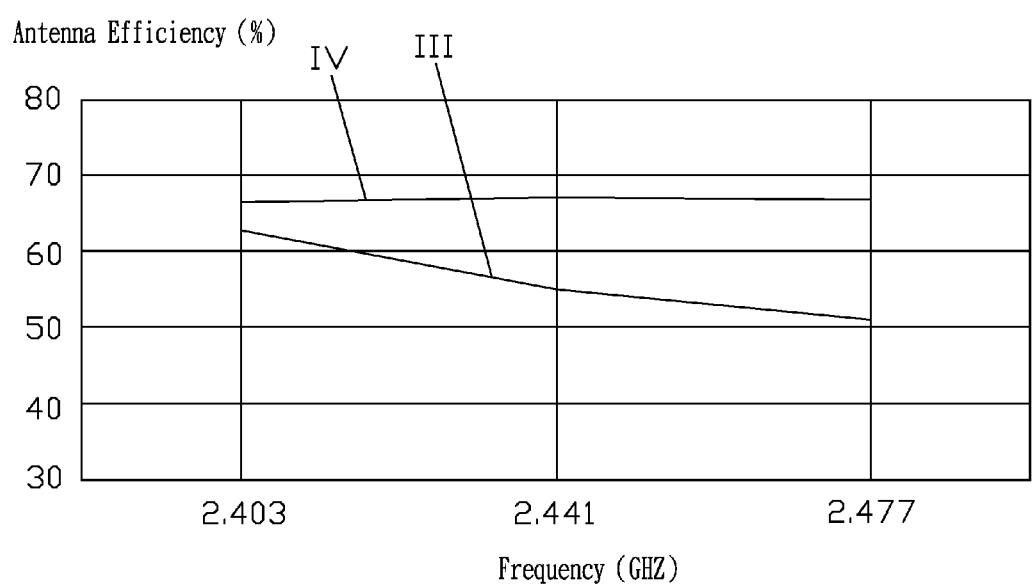
FIG. 4 shows an antenna efficiency test chart of the monopole antenna of the wireless mouse of FIG. 2.

Please refer to FIG. 4. The graph III shows the antenna efficiency test values of the Planar Inverted-F Antenna (PIFA) 14 of the conventional wireless mouse in FIG. 1. When the PIFA 14 operates at 2.403000 GHz, 2.441000 GHz and 2.477000 GHz, the antenna efficiency values are 62.86%, 54.98% and 50.98%, respectively. So the PIFA 14 has an average efficiency of 56.27%. The graph IV shows the antenna efficiency test values of the monopole antenna 24 disposed in the wireless mouse of the present invention. When the monopole antenna 24 operates at 2.403000 GHz, 2.441000 GHz and 2.477000 GHz, the antenna efficiency values are 66.47%, 67.76% and 67.41%, respectively. So the monopole antenna 24 has an average efficiency of 67.21%. As seen from above, the average efficiency value of the monopole antenna 24 is obviously greater than that of the PIFA 14 when they are respectively operated at about 2.4 GHz frequency range.

As described above, the wireless mouse of the present invention disposes the monopole antenna 24, which occupies a smaller space and has a simpler design, on the middle of the front end of the printed circuit board assembly 22 to effectively utilize leisure space in the front of the wireless mouse and further miniaturize the wireless mouse. Moreover, it makes the monopole antenna 24 out of the influence from electronic elements (not labeled) of the printed circuit board assembly 22 and users' hands when the wireless mouse is in use, to achieve a better use performance.

What is claimed is:

1. A wireless mouse, comprising:
    a mouse housing;
    a printed circuit board assembly assembled in the mouse housing, a front end of the printed circuit board assembly defining two fastening holes spaced from each other along a direction perpendicular to a front-to-rear direction; and
    an antenna mounted on the front end of the printed circuit board assembly, the antenna having a substantial long-strip radiating portion, two opposite ends of the radiating portion being bent rearward and then downward to form a hook portion and a feed portion which are respectively hooked in the corresponding fastening holes to make the radiating portion transversely mounted over the front end of the printed circuit board assembly, the feed portion being electrically connected with a feed circuit of the printed circuit board assembly.

2. The wireless mouse as claimed in claim 1, wherein the antenna is a monopole antenna.

3. The wireless mouse as claimed in claim 1, wherein the radiating portion is slightly bent downward to show a substantial gentle V-shape.

4. The wireless mouse as claimed in claim 1, wherein the feed portion is electrically connected with the feed circuit of the printed circuit board assembly by means of injecting melted metallic copper in the corresponding fastening hole.

* * * * *